United States Patent

Catanzarite

[11] 4,397,083
[45] Aug. 9, 1983

| | | | |
|---|---|---|---|
| 3,184,342 | 5/1965 | Seibel | 429/174 |
| 3,197,527 | 7/1965 | Krummeich | 264/105 |
| 3,712,836 | 1/1973 | Per Bro et al. | 429/174 |
| 3,796,606 | 3/1974 | Lehmann et al. | 429/94 |
| 3,897,265 | 7/1975 | Jaggard | 29/623.1 |
| 3,907,593 | 9/1975 | Marincic | 429/199 |
| 3,985,573 | 10/1976 | Johnson et al. | 429/161 |
| 4,117,300 | 9/1978 | Ricards | 29/623.1 |
| 4,133,856 | 1/1979 | Ikeda et al. | 264/105 |
| 4,182,028 | 1/1980 | Epstein et al. | 429/174 |

[54] CATHODE STRUCTURE AND METHOD

[76] Inventor: Vincent O. Catanzarite, 365 Desert Inn Rd., Las Vegas, Nev. 98109

[21] Appl. No.: 199,344

[22] Filed: Oct. 21, 1980

Related U.S. Application Data

[63] Continuation of Ser. No. 896,513, Apr. 17, 1978, abandoned.

[51] Int. Cl.³ .............. H01M 6/00; H01M 4/08
[52] U.S. Cl. .................. 29/623.2; 264/105; 141/110
[58] Field of Search ........... 29/623.2, 623.1, 623.5; 429/164, 163, 162, 174, 196, 66; 264/105; 141/110

[56] References Cited

U.S. PATENT DOCUMENTS

| 1,259,485 | 3/1918 | Byrne | 29/623.2 |
|---|---|---|---|
| 1,526,620 | 2/1925 | Yngve et al. | 29/623.1 |
| 2,569,410 | 9/1951 | De Craene | 141/110 |
| 2,682,686 | 7/1954 | Mrozowski | 264/105 |
| 3,040,117 | 6/1962 | Jammet | 29/623.2 |

*Primary Examiner*—Daniel C. Crane

[57] ABSTRACT

An electrochemical cell is disclosed herein and includes a casing arrangement which defines a fluid sealed inner compartment and which includes means defining first and second electrically insulated, external terminals. The cell also includes an anode, a cathode and electrolyte located within the compartment for producing a voltage drop across the terminals. The cell efficiency is improved by having a cathode of pure unbindered carbon which is compacted into pellet form and acts as a spring to insure an intimate relationship between anode and cathode throughout the life of the cell.

13 Claims, 4 Drawing Figures

CATHODE STRUCTURE AND METHOD

This is a continuation of application Ser. No. 896,513 filed Apr. 17, 1978, abandoned.

BACKGROUND OF THE INVENTION

The present invention relates generally to batteries and more particularly to an electrochemical battery which utilizes a highly reactive "consumable" anode material such as the alkali metals.

A typical electrochemical battery includes an outer casing and electrically insulated terminals which together define a sealed interior chamber. It also typically includes an arrangement of chemically interacting components located within the chamber for producing a voltage drop of a characteristic volume across the terminals. A common arrangement of this type is made up of an anode, an electrically insulated and spaced apart cathode and an electrolyte solution which fills the chamber and surrounds the various other components making up the arrangement.

To meet substantial demands for higher performance batteries, substantial work has been done with cell chemistries using an alkali metal anode and particularly lithium. The cathode and electrolyte material consisting of a solvent and solute vary. Indeed, the literature is replete with examples of alkali metal anode cells with different cathodes and electrolytes. The electrical characteristics of these cells such as energy per unit volume, called energy density; cell voltage; and internal impedance vary greatly.

Among all the known combinations of lithium anodes with different cathodes and electrolytes, those believed to have among the highest energy density and current delivery capability use certain inorganic liquids as the active cathode depolarizer. This type of cell chemistry is commonly referred to as liquid cathode.

The use of a liquid as an active cathode depolarizer is a radical departure from conventional cell technology. Until recently, it was generally believed that the active cathode depolarizer could never directly contact the anode. However, it has recently been discovered that certain active cathode materials do not react chemically to any appreciable extent with an active anode metal at the interface between the metal and the cathode material, thereby allowing the cathode material to contact the anode directly.

A major step forward in the development of liquid cathode cells was the discovery of a class of inorganic materials, generally called oxyhalides, that are liquids at room temperature. These materials perform the function of active cathode depolarizers. Additionally, they may also be used as the electrolyte solvent. Liquid cathode cells using oxyhalides are described in U.S. Pat. No. 3,926,699 issued to Auborn on Dec. 16, 1975 and in British Pat. No. 1,409,307 issued to Blomgren, et al. on Oct. 18, 1975. At least one of the oxyhalides, thionyl chloride ($SOCL_2$), in addition to having the general characteristics described above, also provides substantial additional energy density and current delivery capability.

As described in the Auborn and Blomgren patents, the anode is lithium metal or alloys of lithium and the electrolyte solution is an ionically conductive solute dissolved in a solvent that is also an active cathode depolarizer. Regarding this latter constituent, specifically the electrolyte solution (or "electrolyte" generally), in the various preferred embodiments of the present invention to be discussed hereinafter, this solution including its solute and solvent, which also acts as the active cathode polarizer (liquid cathode), comprises part of the chemically interacting constituents referred to above.

The solute may be a simple or double salt which will produce an ionically conductive solution when dissolved in the solvent. Preferred solutes are complexes of inorganic or organic Lewis acids and inorganic ionizable salts. The requirements for utility are that the salt, whether simple or complex, be compatible with the solvent being employed and that it yield a a solution which is ionically conductive. According to the Lewis or electronic concept of acids and bases, many substances which contain no active hydrogen can act as acids or acceptors or electron doublets. In U.S. Pat. No. 3,542,602 it is suggested that the complex or double salt formed between a Lewis acid and an ionizable salt yields an entry which is more stable than either of the components alone.

Typical Lewis acids suitable for use in the present invention include aluminum chloride, antimony pentachloride, zirconium tetrachloride, phosphorus pentachloride, boron fluoride, boron chloride and boron bromide.

Ionizable salts useful in combination with the Lewis acids include lithium fluoride, lithium chloride, lithium bromide, lithium solfide, sodium fluoride, sodium chloride, sodium bromide, potassium fluoride, potassium chloride and potassium bromide.

The double salts formed by a Lewis acid and an inorganic ionizable salt may be used as such or the individual components may be added to the solvent separately to form the salt. One such double salt, for example, is that formed by the combination of aluminum chloride and lithium chloride to yield lithium aluminum tetrachloride.

In addition to an anode, active cathode depolarizer (liquid cathode) and ionically conductive electrolyte, these cells require a current collector or cathode collector which is of particular interest to a number of aspects of the present invention.

Applicant has found that there are a number of factors relating to cathode current collector material selection and assembly procedures that dramatically affect the performance of these cells. In particular applicant has found that the energy density, power density and attitude sensitivity of these type cells are strongly affected by the cathode current collector.

Some of the problems that applicant's invention addresses are.

First, the anode in these cells in consumable. That is, an anode constructed of, for example, magnesium or a more highly reactive material such as lithium or sodium gradually decreases in size, at least to a limited extent, as it dissolves during the discharge of the battery.

While the utilization of a consumable anode has its advantages, it also has disadvantages. Specifically, as the anode is consumed and therefore gradually decreases in size, the spacing between the anode and cathode collector increases. This, in turn, reduces the overall efficiency of the various components to interact with one another for producing the desired voltage drop. Moreover, it should be apparent that as the anode gradually loses volume, the effective volume within the chamber can increase. This, in turn, could create gas pockets or voids within the electrolytic solution surrounding the anode and cathode collector which could reduce the efficiency of the battery if these voids locate themselves in proximity to the anode.

Secondly, it has been found that the particular attitude, that is, the relative position of a battery of the general type described above may affect its efficiency. More specifically, it has been found that a battery of this type, if maintained in an upright position (top side up), generally displays a longer life than if it were maintained in a different position, for example on edge (90° from its upright position) or upside down (180°). It is believed, at least by some, that this is the result of the presence of gas pockets or voids within the battery chamber, as described above. In any event, it is a very real phenomenon and can be a serious drawback to electrochemical cells or batteries of the type described.

One solution for overcoming at least some of the disadvantages described above is disclosed in U.S. Pat. No. 3,985,573 (Johnson et al). This patent discloses an electrochemical cell and specifically one which utilizes a highly reactive anode material such as lithium, sodium, and the like, in conjunction with high energy liquid cathode materials and nonaqueous electrolytes. Moreover, this patent recognizes some of the disadvantages in utilizing a consumable anode such as the decrease in anode volume during discharge which tends to increase the distance between the anode and other components, thereby decreasing the contact between the anode and these other components.

The Johnson et al patent also discloses two prior patents, specifically U.S. Pat. Nos. 3,809,580 and 3,796,606. According to Johnson et al, the '580 patent overcomes the disadvantage just described by providing a roll or coiled electrode assembly, a so called "jellyroll" construction, to insure good contact between the components of the cell during discharge. The '606 patent, according to Johnson et al, discloses a cylindrical electrochemical cell utilizing, among other components, a porous separator and an elastically deformable current collector having a split cylindrical shape in which the elasticity of the current collector enables it to maintain bias contact with the negative electrode at all times, notwithstanding alteration in electrode volumes during discharge of the cell. On the other hand, Johnson et al solves this problem by utilizing, among other components, an elastically deformable carbonaceous cathode collector in the form of a slotted annular bobbin.

While the various solutions just discussed may well maintain a continuous bias on a consumable anode as the latter decreases in size or volume, they do include a number of their own disadvantages. For example, in at least one case, specifically Johnson et al, the solution described requires additional foreign matter within the cell not otherwise required for producing a voltage drop. And, as will be described later, the addition of foreign matter reduces battery efficiency. Moreover, in the '580 and '606 patents, as well as in Johnson et al, the inner components seem to be relatively complicated in design. It should be quite apparent that the addition of foreign matter within the battery and the utilization of complicated components can be relatively expensive. In addition, the use of foreign and/or complicated internal components may result in less available space for voltage producing components, thereby decreasing overall efficiency or it may result in contamination within the cell.

Johnson et al is also found to be lacking in that this patent does not even address itself to the previously discussed problems resulting from the presence of gas pockets or voids within the cell. The utilization of an elastically deformable carbonaceous cathode collector, as described in Johnson et al or, for that matter, the utilization of a jellyroll construction or elastically deformable current collector as recited in Johnson et al does not eliminate or minimize the presence of these voids.

In U.S. Pat. No. 3,907,593 (Marincic), dated Sept. 23, 1975, an electrochemical cell is disclosed utilizing a cathode material which is recited as carbon such as graphite, carbon black, or acetylene black. While carbon is a porous and relatively high surface area material, particularly acetylene black which is highly desirable, the cathode structure disclosed in this patent does not consist essentially of this material but rather includes what is referred to as a screen, presumably to support the cathode material. Unfortunately, this screen is relatively inert with regard to the production of cell voltage and, moreover, it takes up precious space which could be utilized by an "active" constituent. In addition, as recited in the EXAMPLES set forth in the Marincic patent, the cathode material, apart from the screen, is not pure but rather includes 86% acetylene black, 10% graphite and 5% polytetrafluoroethylene binder. This binder, like the screen, does not add to the production of cell voltage but rather takes up precious space which, again, could be utilized by an active constituent. Moreover, it tends to coat the carbon, reducing its effectiveness.

As will be seen hereinafter, the present invention is directed to a battery and particularly to an electrochemical battery which overcomes the aforedescribed disadvantages, in an uncomplicated, economical and reliable manner.

OBJECTS AND SUMMARY

It is an object of the invention to increase energy density of liquid cathode cells.

Another object of the invention is to increase power density of liquid cathode cells.

Finally, it is an object of the invention to reduce the attitude sensitivity of liquid cathode cells.

These and other objects of the invention are achieved according to this invention by making the cathode current collector from a binder free high surface area carbonaceous material from which adsorbed and absorbed ambient gases have been removed and by loading the cell can in such a way that the cathode current collector acts as a spring to maintain a constant minimum separation distance between the cathode current collector and the anode.

DETAILED DESCRIPTION AND PREFERRED EMBODIMENTS

Figure 1:
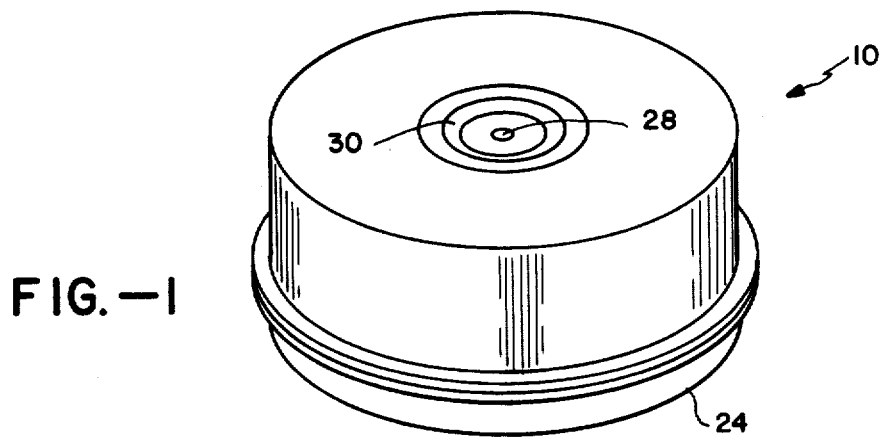
FIG. 1 is a perspective view of an electrochemical cell constructed in accordance with the present invention.

Turning now to the drawings, wherein like components are designated by like reference numerals in the various figures, an electrochemical cell constructed in accordance with the present invention is illustrated and generally designated by the reference numeral 10. While the particular cell illustrated is a button battery, it will become apparent hereinafter that all cells including the larger sized cells may incorporate the various features of the present invention to be described with respect to cell 10.

Figure 2:
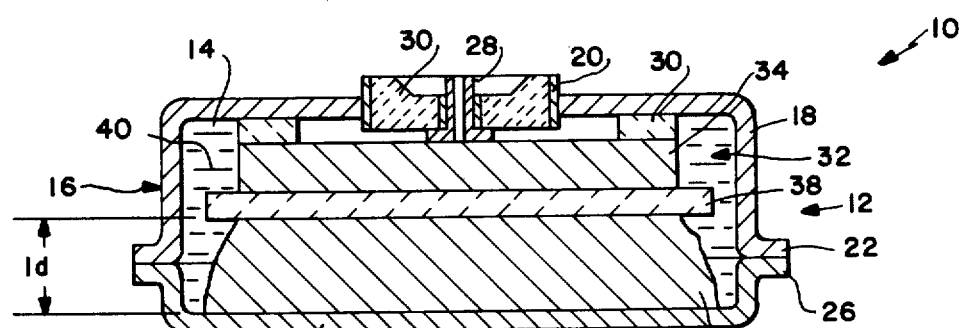
FIG. 2 is an assembled cross sectional view of the cell illustrated in FIG. 1.

Turning specifically to FIGS. 1 and 2, cell 10 is shown to include an overall casing arrangement 12 which defines an internal, fluid tight chamber or compartment 14, specifically one which is hermetically sealed. This overall casing arrangement includes a casing 16 which is comprised of a top cover 18 having a central opening 20 extending through its top end and an outwardly flared circumferential flange 22 located at and around its bottom end. The casing also includes a bottom cover 24 having an outwardly flared circumferential flange 26 which is welded or otherwise suitably fastened to the top cover around the underside of flange 22, as best illustrated in FIG. 2. The casing may be of any desired shape and constructed of any suitable material, of course within practical limits and so long as the selection is compatible with the present invention. However, the casing is preferably identical in design to the casing described in co-pending U.S. patent application Ser. No. 840,522, filed on Oct. 11, 1977 and assigned to Applicant of the present invention.

In addition to casing 16, the overall casing arrangement 12 includes a pair of electrically insulated terminals, one of which is the casing itself in a preferred embodiment. The other electrode, indicated at 28, is constructed of any suitable electrically conductive material, for example stainless steel, and is elongated in shape. Actually, as will become apparent hereinafter, electrode 28 is utilized to introduce the cell's liquid constituent (to be described) into compartment 14 and, hence, is tubular in a preferred embodiment. This terminal extends through opening 20 and is spaced from top cover 18 such that one section of the terminal is positioned within chamber 14 and an opposite end section is positioned outside the casing. in actuality, it is this opposite end section which acts as the second external terminal of the battery.

In order to isolate terminal 28 from the casing, overall casing arrangement 12 also includes a circumferential insulation member 30 which is located within and which fills opening 20 in top cover 18, concentrically around terminal 28, thereby insulating this terminal from the casing. The outer circumferential surface of the insulator is bonded in a continuous fashion to the top cover 18 around opening 20 and its inner circumferential surface is bonded in a continuous fashion to and around the outer surface of terminal 28. However, in a preferred embodiment, the insulator is identical to the ceramic insulator described in Applicant's co-pending application, Ser. No. 840,520, filed on Oct. 11, 1977.

In addition to overall casing arrangement 12, battery 10 includes an arrangement of chemically interacting components which are generally designated at 32 in FIG. 2 and which produce the desired voltage difference across the cell terminals, specifically between terminal 28 and casing 16. These components or constituents include an anode 34 and a solid cathode collector 36 which is spaced from and in confronting relation with the anode, both of which will be discussed in detail hereinafter. Suitable electrically nonconductive spacers 38, for example glass or ceramic discs, are located on opposite sides of anode 34 for insulating the anode from the solid cathode and also from top cover 18. An example of specific spacers can be found in the previously recited Auburn U.S. Pat. No. 3,926,669. In addition to these components, the overall voltage difference producing arrangement includes an electrolyte solution, preferably of the type previously described including a solute (salt) and a solvent which also acts as the active cathode depolarizer (liquid cathode) generally designated at 40. This solution is located within and fills chamber 14 and thus is in direct contact with the anode, cathode collector and inner surface of casing 16. The particular way in which this liquid cathode electrolyte is introduced into chamber 14, in accordance with the present invention, will be discussed hereinafter.

Turning specifically to the constituents making up voltage difference producing arrangement 32, attention is first directed to anode 34. This anode, in a preferred embodiment, is a consumable component, specifically lithium. In an actual working embodiment, the lithium is disc shaped, formed from a sheet of lithium metal. In an actual working embodiment, the electrolyte solution consists of an active cathode depolarizer (liquid cathode) which is the solvent and a solute dissolved in the solvent. These various constituents have been discussed previously.

In accordance with one aspect of the present invention, the solid cathode collector 36 is selected to maximize its efficiency within the cell. To accomplish this, the cathode collector, with one exception to be discussed below, has been selected to consist of or at least consist essentially of a high surface unbonded carbon, for example carbon black or acetylene black, but specifically acetylene black in the preferred embodiment. The carbonaceous cathode collector is not just acetylene black but one which has been provided in a very fine powder, specifically one having a mean particle size of about 425 angstroms. The cathode collector in a preferred embodiment is unbonded; that is, it does not include a bonding substance to hold it together. It has been found by applicant that bonding materials significantly reduce the efficiency of the current collector by coating much of the carbon surface area that would otherwise catalyze the electrochemical reaction. Moreover, in this preferred embodiment the carbonaceous cathode collector is prebaked for about 12 hours at between 375° C. and 400° C. at a vacuum of at least about 28" hg. to eliminate as much moisture as possible. In addition, as will be seen hereinafter, this cathode collector is provided in a preassembled, compressed form having a specific density and size so that when it is ultimately assembled within the compartment 14, it is compressed sufficient to increase its density at least about threefold. In an actual working embodiment, prior to assembly, the cathode collector is a disc which, with one exception, consists essentially of acetylene black (no binders or other such means) having a diameter of 720 mils, and a thickness of 70 mils. The exception is the inclusion of copper particles. The particulars regarding the use of these particles are discussed in co-pending Application Ser. No. 828,493 filed Aug. 29, 1977 and assigned to Applicant of the present application and reference is made thereto.

Figure 3:
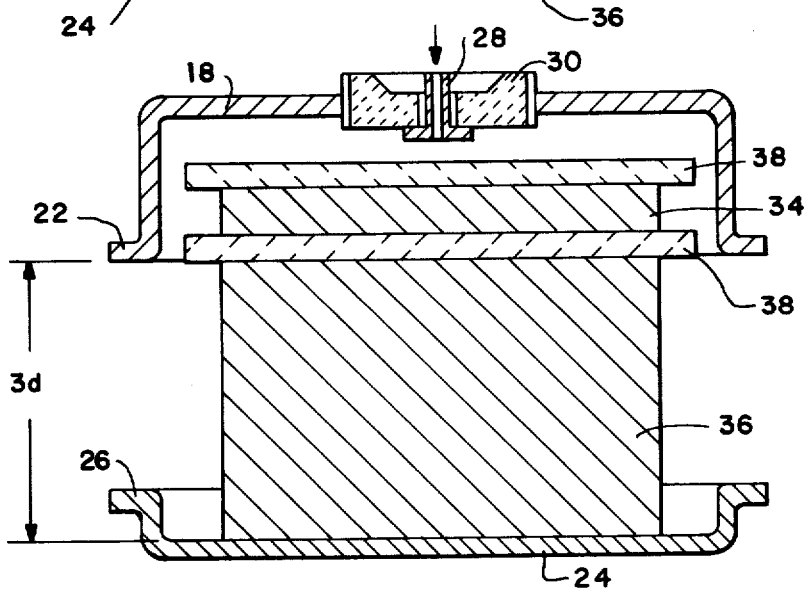
FIG. 3 is a partially unassembled sectional view of the cell illustrated in FIG. 1.

Having described the various components making up electrochemical cell 10, attention is now directed to the manner in which the cell is assembled. As illustrated in FIG. 3 the top and bottom covers, 18 and 24 respectively, are initially separate from one another. Of course, the terminal 28 and insulator 30 are in a sealed position in the top cover. However, the tubular terminal remains open, that is uncrimped, for fluid passage therethrough. As illustrated in FIG. 3, the various solid components making up arrangement 32 are stacked on top of bottom cover 24, starting with solid cathode collector 36 and followed by one of the separators 38, then the anode 34 and finally the top separator. It should be noted first that this stack of constituents extends a substantial distance beyond the top edge of the bottom cover, specifically beyond flange 26 and, second, that the solid cathode collector, in its precompressed state, has a thickness which will be generally designated "3d".

Unbonded high surface area carbon comes from the supplier in fine dust-like powder. In this form, its density is not suitable, quantities cannot be accurately controlled, and it is virtually impossible to handle in a manufacturing environment. These problems are solved simultaneously by pressing a precisely measured weight of carbon into a pellet using a pill press with suitably designed tooling. The resulting pellet, although fragile, can be handled for assembly purposes and its density and weight can be precisely controlled.

By choosing the particle size of the carbon and the amount by which it is compacted, the capillary size and the spring characteristics of the cathode may be controlled to a certain extent.

With the solid components arranged in the way just described, the two covers are brought together by a conventional press apparatus (not shown) and joined in a fluid-tight manner at their confronting flanges 22 and 26 by suitable conventional means such as welding. In doing this, the compressible constituents making up arrangement 32, specifically the carbonaceous cathode collector is further compressed. In a preferred embodiment, the solid cathode collector is sized to compress from its original precompressed thickness of 3d to ⅓ its thickness or to 1d, as illustrated, without appreciably changing in any other dimension. As a result, the cathode collector is compressed sufficient to increase its density about threefold. This has the effect of maintaining the cathode current collector in intimate contact with the anode as the anode is reacted away in the electrochemical process and thereby enhances the capillary effect that evenly disposes unreacted electrolyte.

In accordance with another aspect of the present invention, all of the solid constituents making up a voltage difference producing arrangement 32 are prebaked as part of the overall method of assembling the cell. In accordance with this method, these solid constituents, specifically previously described anode 34, cathode collector 36 and the two spacers 38, as well as any other solid constituents are placed within compartment 14. The two covers 18 and 24 are brought together and connected at their respective flanges 22 and 26, as previously described. However, prior to introducing solution 40 into the cell and prior to completely sealing the cell at terminal 28, the cell is subjected to a predetermined amount of heat for a predetermined period of time. In this way, if any of the solid components have previously absorbed the referred to ambient type gases, for example oxygen and nitrogen, at least some of these gases are driven off prior to sealing the cell. The time during which the various solid constituents are subjected to the heat as well as the exact amount of heat utilized will depend upon a number of factors including the particular types of solid constituents utilized and their size. Based on the teachings of the present invention, one could readily elect an optimum temperature and an optimum time.

In a preferred embodiment of the present invention, the overall casing arrangement and the various solid constituents are heated under vacuum, specifically in a conventional vacuum oven. In this preferred embodiment, the cell is subjected to a temperature of about 150° C. for about 4 hours at a vacuum level of at least 28 inches of mercury. In this way, at least a large percentage of the adsorbed ambient type gases are driven out of the solid constituents and out of the cells compartment through the passage provided in tubular terminal 28.

It is not necessarily intended that the step just described be provided in lieu of prebaking cathode collector 36 as described previously. Where this latter step of baking all of these solid constituents is sufficient to drive off the desired amount of moisture from the cathode collector, it is not necessary to individually prebake the cathode collector. However, in most instances this will not be the case, that is this latter step of baking all of the solid constituents will not be sufficient to drive off the desired amount of moisture within the cathode collector and hence it would be advisable to prebake the collector individually. Once the various solid constituents have been baked, the cell is allowed to cool and thereafter the liquid cathode is introduced into the compartment and the cell is completely sealed, as will be described.

Figure 4:
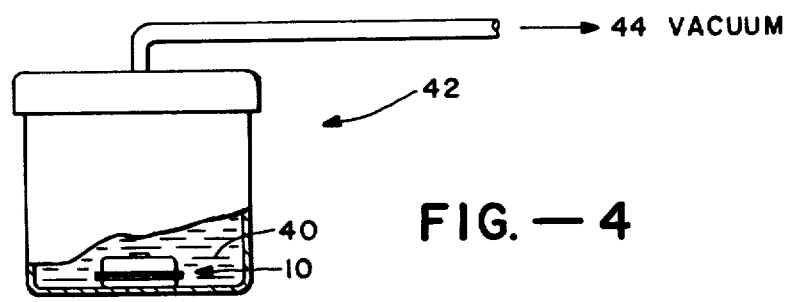
FIG. 4 is a schematic illustration of an arrangement which is utilized in assembling the cell, illustrated in FIG. 1.

While the various solid constituents making up the voltage drop producing arrangement 32 are compressed within compartment 14 and the two covers are joined, the entire cell nevertheless remains unsealed as a result of tubular terminal 28. In this unsealed condition, the cell is immersed in a bath 42 of electrolytic solution 40, as illustrated in FIG. 4. A conventional vacuum indicated schematically at 44 is applied across the only opening in the bath in order to subject the bath including the immersed casing arrangement to a predetermined vacuum, for example, at least 28 inches of mercury. In this way, gases within compartment 14 are drawn out and the compartment is filled with the liquid solution to the exclusion of most gases therein. This not only means that the spaces between the solid constituents are filled but also that the carbonaceous cathode collector is substantially completely wet-out, that is, substantial absorption occurs so that the solution fills the interstices between the particles making up the cathode collector. Once this takes place, the cell can be completely sealed, for example, by crimping and closing off tubular terminal 28.

Having described electrochemical cell 10 and its method of assembly, it should be apparent that applicant goes to great lengths to provide a cathode current collector with a very large and high quality surface. By selecting finely directed acetylene black and by prebaking it to remove gas molecules adsorbent on the surface, the amount of surface area which is made available to the liquid cathode is substantially improved. By compressing the acetylene black, particularly sufficient to increase its density threefold, the capillary action of the current collector is improved. By introducing the liquid cathode by means of vacuum, the amount which is made available to the acetylene black is itself increased and gas voids are minimized. As a result of the foregoing, the performance of cell 10 is improved.

I claim:

1. In a method of assembling an electrochemical cell having (i) a casing arrangement including a top member and a bottom cup-shaped member which defines a fluid sealed inner compartment and which includes means defining first and second electrically insulated terminals, and (ii) means located within said compartment for producing a voltage difference across said terminals, said voltage difference producing means including a plurality of solid components including a binder-free carbonaceous material and a liquid electrolyte, said method comprising:
   (i) forming said carbonaceous material into a pellet having a weight and density thereby forming one of said solid components;
   (ii) stacking said solid components in said bottom cup-shaped member, said solid components extending up from the top edge of said bottom cup-shaped member a predetermined distance
   (iii) positioning the top member on top of said solid components;
   (iv) compressing said top and bottom members together to compress said solid components within said compartment;
   (v) attaching said member together;
   (vi) immersing said casing arrangement including said solid components in a bath of said liquid electrolyte;
   (vii) subjecting said bath including said immersed casing arrangement to a vacuum, whereby said liquid cathode fills said compartment to the exclusion of substantially all gases therein; and
   (viii) after filling said compartment with said liquid electrolyte fluid sealing said compartment.

2. A method according to claim 1 wherein said cathode collector is compressed sufficient to increase in density at least about threefold.

3. A method according to claim 1 wherein one of said solid components is a cathode collector including a binder-free carbonaceous material, said method including the step of baking said cathode collector to substantially remove any moisture therein.

4. A method according to claim 3 wherein said cathode collector is baked for about 12 hours at a temperature of between 375° C. and 400° C. at a vacuum of at least about 38 inches of mercury.

5. A method of assembling an electrochemical cell including
   (i) a casing arrangement having top and bottom covers which define a fluid sealed inner compartment and which includes means defining first and second electrically insulated terminals, and
   (ii) means including solid components located with said compartment for producing a voltage difference across said terminals, said voltage difference producing means including a solid cathode collector including a binder-free carbonaceous material and a liquid electrolyte, said method comprising:
   (a) preforming said cathode collector into a binder-free carbonaceous solid component;
   (b) stacking said solid components including said cathode collector in said bottom cover, said solid components extending up from the top edge of said bottom cover a predetermined distance;
   (c) positioning the top cover on top of said solid components;
   (d) compressing said covers together whereby said cathode collector is compressed sufficient to increase in density about threefold;
   (e) attaching said covers together;
   (f) introducing said liquid electrolyte into said compartment; and
   (g) sealing said compartment.

6. A method of assembling an electrochemical cell including
   (i) a casing arrangement having top and bottom covers which are connected together to define a fluid sealed inner compartment and which includes means defining first and second electrically insulated terminals, and
   (ii) means located within said compartment for producing a voltage difference across said terminals, said voltage difference producing means including a liquid electrolyte and a plurality of solid components including a solid cathode collector including binder-free acetylene black which is in powder form, said method comprising:
   (a) forming said acetylene black into a pellet of predetermined weight and density thereby forming one of said solid components;
   (b) prebaking said cathode collector to remove substantially any moisture therein;
   (c) prior to sealing said casing arrangement, placing said solid components of said voltage difference producing means in said compartment, including
      (i) stacking said solid components on said bottom cover, said solid components extending up from the top edge of said bottom cover a predetermined distance,
      (ii) positioning the top cover on top of said solid components,
      (iii) compressing said cover together to compress said solid components within said compartment, said cathode collector being compressed sufficient to increase in density least about threefold,
      (iv) attaching said covers together, and
      (v) heating all of said solid components including said prebaked cathode collector for a predetermined period of time, at a predetermined temperature and under a predetermined vacuum;
   (d) immersing said unsealed casing arrangement including said solid components in a bath of said liquid cathode;
   (e) subjecting said bath including said immersed casing arrangement to a vacuum, whereby said liquid cathode fills said compartment to the exclusion of substantially all gases therein; and
   (f) after filling said compartment with said liquid cathode, fluid sealing compartment.

7. In a method of assembling an electrochemical cell including
   (i) a casing arrangement which defines a fluid sealed inner compartment and which includes means defining first and second electrically insulated terminals, and
   (ii) means located within said compartment for producing a voltage difference across said terminals, said voltage difference producing means including a solid cathode collector including a binder-free carbonaceous material and a plurality of other solid constituents, said method comprising:

(a) baking said binder-free cathode collector to substantially completely remove any moisture therein;

(b) placing said voltage difference producing means including said baked cathode collector in said compartment;

(c) enclosing said voltage difference producing means in said casing;

(d) subjecting said incased voltage difference producing means to a predetermined elevated temperature for a predetermined time; and (e) introducing and sealing fluid within said casing subsequent to the step of subjecting said incased voltage difference producing means to said elevated temperature.

8. The method according to claim 7 wherein said solid constituents are subjected in step (d) to a temperature of at least 150° C. for 4 hours at a vacuum of at least 12 inches of mercury.

9. A method of assembling an electrochemical cell including (i) a casing arrangement having top and bottom covers which define a fluid sealed inner compartment and which includes means defining first and second electrically insulated terminals, and (ii) means located within said compartment for producing a voltage difference across said terminals, said voltage difference producing means including a solid cathode collector incuding a carbonaceous material, said method comprising:

(a) preforming said cathode collector into a binder-free carbonaceous solid component;

(b) stacking said solid components including said cathode collector in said bottom cover, said solid components extending up from the top edge of said bottom cover a predetermined distance;

(c) positioning to top cover on top of said solid components;

(d) compressing said covers together whereby said cathode collector is compressed sufficient to increase in density about threefold;

(e) attaching said covers together; and (f) sealing said compartment.

10. In a method of assembling an electrochemical cell having (i) a casing arrangement including a top member and a bottom cup-shaped member which defines a fluid sealed inner compartment and which includes means defining first and second electrically insulated terminals, and (ii) means located within said compartment for producing a voltage difference across said terminals, said voltage difference producing means including a plurality of solid components including a compressible material and a liquid electrolyte, said method comprising:

(i) forming said compressible material into a pellet having a weight and density thereby forming one of said solid components;

(ii) stacking said solid components in said bottom cup-shaped member, said solid components extending up from the top edge of said bottom cup-shaped member a predetermined distance;

(iii) positioning the top member on top of said solid components;

(iv) compressing said top and bottom members together to compress said solid components within said compartment;

(v) attaching said members together;

(iv) immersing said casing arrangement including said solid components in a bath of said liquid electrolyte;

(vii) subjecting said bath including said immersed casing arrangement to a vacuum, whereby said liquid cathode fills said compartment to the exclusion of substantially all gases therein; and (viii) after filling said compartment with said liquid electrolyte fluid sealing said compartment.

11. A method of assembling an electrochemical cell including (i) a casing arrangement having top and bottom covers which define a fluid sealed inner compartment and which includes means defining first and second electrically insulated terminals, and (ii) means including solid components located with said compartment for producing a voltage difference across said terminals, said voltage difference producing means including a solid cathode collector including a binder-free carbonaceous material and a liquid electrolyte, said method comprising:

(a) preforming said cathode collector into a binder-free carbonaceous solid component;

(b) stacking said solid components including said cathode collector in said bottom cover, said solid components extending up from the top edge of said bottom cover a predetermined distance;

(c) positioning the top cover on top of said solid components;

(d) compressing said covers together whereby said cathode collector is compressed sufficient to increase in density;

(e) attaching said covers together;

(f) introducing said liquid electrolyte into said compartment; and (g) sealing said compartment.

12. In a method of assembling an electrochemical cell including (i) a casing arrangement which defines a fluid sealed inner compartment and which includes means defining first and second electrically insulated terminals, and (ii) means located within said compartment for producing a voltage difference across said terminals, said voltage difference producing means including a solid cathode collector and a plurality of other solid constituents, said method comprising:

(a) baking said cathode collector to substantially completely remove any moisture therein;

(b) placing said voltage difference producing means including said baked cathode collector in said compartment;

(c) enclosing said voltage difference producing means in said casing;

(d) subjecting said incased voltage difference producing means to a predetermined elevated temperature for a predetermined time; and (e) introducing and sealing fluid within said casing subsequent to the step of subjecting said incased voltage difference producing means to said elevated temperature.

13. A method of assembling an electrochemical cell including (i) a casing arrangement having top and bottom covers which define a fluid sealed inner compartment and which includes means defining first and second electrically insulated terminals, and (ii) means located within said compartment for producing a voltage difference across said terminals, said voltage difference producing means including a solid cathode collector including a carbonaceous material, said method comprising:
(a) preforming said cathode collector into a binder-free carbonaceous solid component;
(b) stacking said solid components including said cathode collector in said bottom cover, said solid components extending up from the top edge of said bottom cover a predetermined distance;
(c) positioning to top cover on top of said solid components;
(d) compressing said covers together whereby said cathode collector is compressed sufficient to increase in density a predetermined amount;
(e) attaching said covers together; and
(f) sealing said compartment.

* * * * *